(12) United States Patent
Doha et al.

(10) Patent No.: US 10,012,359 B2
(45) Date of Patent: Jul. 3, 2018

(54) LIGHT GUIDE FOR A LIGHTING AND/OR SIGNALING DEVICE OF AN AUTOMOBILE VEHICLE

(71) Applicant: Valeo Vision, Bobigny (FR)

(72) Inventors: Jean-Francois Doha, Saint Barthelemy d'Anjou (FR); Francois Germon, Fontaine Guerin (FR); Maxime Laminette, Angers (FR)

(73) Assignee: Valeo Vision, Bobigny (FR)

( * ) Notice: Subject to any disclaimer, the term of this patent is extended or adjusted under 35 U.S.C. 154(b) by 599 days.

(21) Appl. No.: 14/429,963

(22) PCT Filed: Sep. 26, 2013

(86) PCT No.: PCT/EP2013/070120
§ 371 (c)(1),
(2) Date: Mar. 20, 2015

(87) PCT Pub. No.: WO2014/049082
PCT Pub. Date: Apr. 3, 2014

(65) Prior Publication Data
US 2015/0247613 A1    Sep. 3, 2015

(30) Foreign Application Priority Data
Sep. 26, 2012   (FR) ..................... 12 59017

(51) Int. Cl.
*F21V 8/00* (2006.01)
*F21S 8/10* (2006.01)
(Continued)

(52) U.S. Cl.
CPC ......... *F21S 48/1241* (2013.01); *F21S 41/143* (2018.01); *F21S 41/24* (2018.01);
(Continued)

(58) Field of Classification Search
CPC .............. F21S 48/1241; F21S 48/1329; F21S 48/2243; F21S 48/2262; F21S 48/2275;
(Continued)

(56) References Cited

U.S. PATENT DOCUMENTS 8,061,880 B2 *  11/2011  Lambert .............. B60Q 1/0041
                                                362/511
8,353,612 B2     1/2013  de Lamberterie
(Continued)

FOREIGN PATENT DOCUMENTS

DE    102010005806 A1   7/2011
EP       2363738 A2     9/2011
(Continued)

*Primary Examiner* — Alan Cariaso
(74) *Attorney, Agent, or Firm* — Oblon, McClelland, Maier & Neustadt, L.L.P.

(57) ABSTRACT

A light guide for a lighting and/or signaling device of an automobile vehicle comprising an entry face, a coupler, a main reflection face, and an exit face. The light guide is arranged in such a manner that, when a light source is disposed at a predetermined point with respect to the light guide, the entry face transmits the light from the light source to the coupler and the coupler transmits a part of this light to the main reflection face which directs it, in the form of a beam of parallel rays, directly or indirectly, toward the exit face in a direction forming an angle of 5° at the most with respect to the optical axis of the light guide.

18 Claims, 5 Drawing Sheets

(51) Int. Cl.
*F21S 41/143* (2018.01)
*F21S 41/24* (2018.01)
*F21S 41/32* (2018.01)
*F21S 41/36* (2018.01)
*F21S 43/14* (2018.01)
*F21S 43/239* (2018.01)
*F21S 43/243* (2018.01)
*F21S 43/249* (2018.01)

(52) U.S. Cl.
CPC ............ *F21S 41/322* (2018.01); *F21S 41/36* (2018.01); *F21S 43/14* (2018.01); *F21S 43/239* (2018.01); *F21S 43/243* (2018.01); *F21S 43/249* (2018.01); *G02B 6/002* (2013.01); *G02B 6/0018* (2013.01); *G02B 6/0031* (2013.01); *G02B 6/0036* (2013.01)

(58) Field of Classification Search
CPC ...... F21S 48/2281; F21S 41/24; F21S 41/141; F21S 41/143; F21S 41/322; F21S 43/14; F21S 43/239; F21S 43/243; F21S 43/249; G02B 6/0018; G02B 6/002; G02B 6/0031; G02B 6/0036
See application file for complete search history.

(56) References Cited

U.S. PATENT DOCUMENTS

| | | | | |
|---|---|---|---|---|
| 8,434,892 | B2* | 5/2013 | Zwak | G02B 6/0018 362/235 |
| 8,506,129 | B2* | 8/2013 | Okada | F21S 48/115 362/296.01 |
| 8,684,575 | B2* | 4/2014 | Mitsuhashi | G02B 6/0045 362/299 |
| 2008/0013333 | A1* | 1/2008 | Koizumi | B60Q 1/2696 362/511 |
| 2010/0232172 | A1 | 9/2010 | de Lamberterie | |
| 2010/0246200 | A1 | 9/2010 | Tessnow et al. | |

FOREIGN PATENT DOCUMENTS

FR 2943118 A1 9/2010
FR 2966224 A1 4/2012

* cited by examiner

LIGHT GUIDE FOR A LIGHTING AND/OR SIGNALING DEVICE OF AN AUTOMOBILE VEHICLE

CROSS-REFERENCE TO RELATED APPLICATIONS

This application is the U.S. National Phase application of PCT Application No. PCT/EP2013/070120 filed Sep. 26, 2013, which claims priority to the French Application No. 1259017 filed on Sep. 26, 2012, which applications are incorporated herein by reference and made a part hereof.

BACKGROUND OF THE INVENTION

1. Field of the Invention

The present invention relates to lighting and/or signaling devices for automobile vehicles.

2. Description of the Related Art

A known solution is to equip such devices with a light guide taking the form of a sheet and with LEDs (light-emitting diodes) whose light rays are channeled via the guide to the output of the device. A light beam is thus produced from a light guide having a linear, rectilinear or curved profile.

The light beam exhibits an overall direction axis about which the whole beam is distributed, according to a given aperture angle. However, when a light guide is used whose profile is curved, it may be difficult to direct the light beam emitted by the light guide in certain directions, notably toward the interior of the vehicle. "Light beam directed toward the interior of the vehicle" is understood to mean the part of the beam directed forward and toward a central axis of the vehicle.

Furthermore, the illuminated aspect of the light guide having a linear, rectilinear or curved profile may appear non-uniform or even discontinuous along this profile and/or there may not be any beam exiting from the guide in a given direction, the reflection being total inside the guide.

SUMMARY OF THE INVENTION

One aim of the invention is to produce a light guide allowing these drawbacks to be reduced.

For this purpose, the subject of the invention is a light guide for a lighting and/or signaling device of an automobile vehicle, comprising:
at least one entry face,
at least one coupler,
at least one main reflection face,
an exit face,
the guide being arranged in such a manner that, when a light source is disposed at a predetermined point with respect to the guide, the entry face transmits the light from the source to the coupler and the coupler transmits a part of this light to the main reflection face which directs it, in the form of a beam of parallel rays, directly or indirectly, toward the exit face in a direction forming an angle of 5° at the most with respect to the optical axis of the guide.

The optical axis of the guide is in particular the overall direction axis of the beam emitted by the guide and about which the whole beam is distributed, according to a given aperture angle.

Thus, since the rays of the beam directed toward the exit face are parallel to, or form at the most an angle of 5° with, the optical axis of the guide, it is easier for those skilled in the art to direct the light beam exiting from the guide, for example in order to comply with the regulations in force.

Furthermore, thanks to beam of parallel rays, the rays emitted toward the exit face are better distributed and the uniformity of the light beam reaching the exit face is thus improved.

The risk of internal reflection of the beam on the exit face is also reduced.

The guide may furthermore comprise one or more of the following features, taken alone or in combination:

Each coupler is associated with a reflection face.

The entry face has a convex or concave shape. Thus, the light beam entering into the guide is refracted and transmitted toward the coupler.

The guide is arranged such that the main reflection face directs the beam of parallel rays directly toward the exit face.

The guide furthermore comprises a secondary reflection face designed to reflect, toward the exit face, the beam coming from the main reflection face. It may therefore be envisioned to align the coupler and the reflection face along an axis which is not parallel to the optical axis. This notably allows the space occupied by the guide to be reduced.

The main reflection face has a longitudinal cross-section comprising two branches.

The length ratio between the smaller branch of the longitudinal cross-section of the main reflection face and the larger branch of the longitudinal cross-section of the main reflection face is greater than 0.8. Since the two branches are of similar length, the path of the light from the coupler to the reflection face is substantially identical toward each branch of the reflection face. The attenuation of the light intensity due to the absorption by the material forming the guide is therefore similar for each branch of the reflection face and the beam of parallel rays is therefore more uniform than if the branches of the parabola had lengths with a bigger difference. According to one embodiment of the invention, the two branches of the longitudinal cross-section of the main reflection face can have the same length, allowing the uniformity to be improved.

The two branches extend on either side of a plane of symmetry of the longitudinal cross-section.

The longitudinal cross-section of the main reflection face can be a parabolic cross-section. Thus, with the coupler arranged at the focal point of the parabolic cross-section, the coupler transmits a part of the light to the main reflection face which redirects it, in the form of a beam of parallel rays or rays that are approximately parallel to the nearest 5°.

The main reflection face has a longitudinal cross-section with sides inclined with respect to the optical axis of the guide, for example two sides inclined at 45° with respect to the optical axis of the guide. The guide is arranged in such a manner that the sides redirect the light in the form of a beam of parallel rays or approximately parallel rays to the nearest 5°. There can be two inclined sides forming two branches, which can extend on either side of a plane of symmetry of the cross-section and have the same length.

The reflection face comprises, at least over a portion of its length, an aluminized surface.

The reflection face comprises, at least over a portion of its length, a transverse cross-section with a V-shaped profile formed by two surfaces forming an angle between them, for example of 90°. Thus, these two surfaces can operate in total internal reflection mode for the light rays, which obviates the need for an aluminized surface.

The light guide takes the form of a sheet. The term 'sheet' is understood to mean a shape bounded in the direction of the thickness by two faces that are substantially parallel to one another over at least a part of the shape. The sheet itself may have a non-planar shape.

The shape of the exit face is of generally curved form. The exit face can have a curved shape in mutually perpendicular planes. Thus, viewed perpendicularly to the optical axis, this face can have a curved shape. It may also exhibit another curved shape when the guide is viewed in a direction parallel to the optical axis. It will therefore be understood that the exit face has a shape that is generally curved in space. The shape of the exit face can therefore be adapted to the shape of the vehicle onto which the guide is intended to be mounted.

The exit face has the shape of a staircase having steps parallel—to the nearest 10°—with respect to the optical axis and counter-steps each comprising at least one exit facet for the light such that the light exiting from each facet is distributed within a cone whose axis is the optical axis. The aperture angle of this cone is for example less than 100°. For example, for a reversing light, the aperture angle can be in the range between 75 and 90°. This aperture angle may also be less than 60°, preferably 50°, even more preferably 40°, notably for a function of daytime running lamp, also referred to as DRL. It will be understood that the angles are defined in a horizontal plane when the light guide is positioned in a similar manner to the position that it would have if it were installed on an automobile vehicle.

The steps, in the direction of the optical axis, and the counter-steps, in a direction perpendicular to the optical axis, each have dimensions less than 5 mm, preferably less than 3 mm. A relatively uniform beam is thus obtained exhibiting few hot spots and/or hot spots of limited brightness.

The facet of the counter-step has a convex shape. Thus, the rays exiting from the guide via each facet are refracted in such a manner that the interaction of the exiting rays with the adjacent step is minimized and that there is no or very little loss of intensity of the light beam, notably by refraction of the ray toward the interior of the guide through the adjacent step and reflection of the ray on this same step.

The guide comprises at least two coupler main reflection face assemblies. The surface area of the exit face of the guide may be increased. It will be noted that the couplers may have different geometries.

The main reflection faces are connected together by at least one link face with a rectilinear cross-section, preferably parallel to the optical axis of the guide or forming an angle of less than 5° with the optical axis. Thus, the de-molding of the light guide is facilitated and the light distribution uniform. The section supporting the main reflection faces and the link faces thus preferably has a staircase shape.

The light guide is formed as a single piece, notably by molding, for example by molding of a plastic material.

Another subject of the invention is an assembly of a light guide such as previously defined and of at least one light source, preferably a LED.

Another subject of the invention is a lighting and/or signaling device for an automobile vehicle, notably a headlamp, comprising a light guide such as previously defined and/or an assembly according to the present invention.

Another subject according to the invention is an automobile vehicle comprising a light guide and/or an assembly and/or a lighting and/or signaling device according to the present invention.

These and other objects and advantages of the invention will be apparent from the following description, the accompanying drawings and the appended claims.

BRIEF DESCRIPTION OF THE ACCOMPANYING DRAWINGS

The invention will be better understood upon reading the appended figures, which are provided by way of non-limiting examples, in which.

DETAILED DESCRIPTION OF THE PREFERRED EMBODIMENTS

Figure 1:
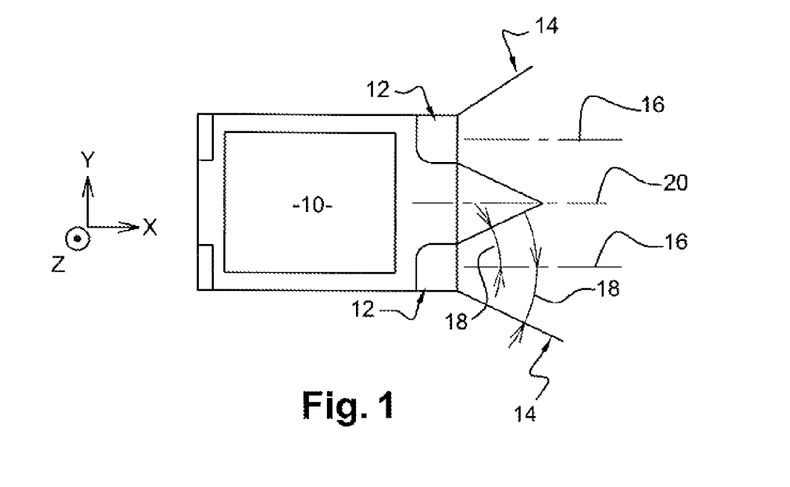
FIG. 1 is a schematic view of an automobile vehicle comprising at least two lighting devices according to the invention.

FIG. 1 shows an automobile vehicle 10 comprising two lighting devices 12. Each lighting device 12 emits a light beam 14 along an optical axis 16 which is parallel to the longitudinal axis 20 of the vehicle 10. Viewed from the top, the light beam 14 forms an angle 18 on either side of the optical axis 16. The part of the light beam 14 directed toward the longitudinal axis 20 is directed toward the interior of the vehicle 10 whereas the other part of the light beam 14 is directed toward the exterior of the vehicle 10.

For greater simplicity, in the following, reference will be made to the orthonormal reference frame shown in the various figures, in which the X direction is the direction of the optical axis 16 and of the longitudinal axis 20, the Y direction is perpendicular to the X direction and forms, with the X axis, a horizontal plane. The Z axis is vertical and is perpendicular to the horizontal plane formed by the X and Y axes.

Figure 2:
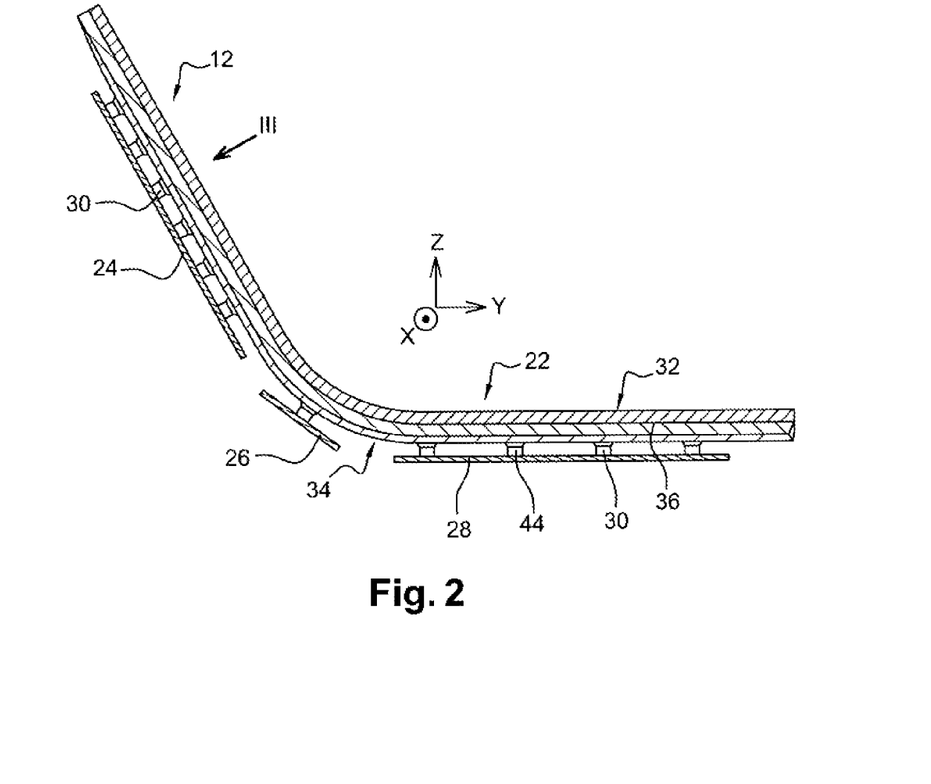
FIG. 2 is a face view of a lighting device according to the invention.

The lighting device 12, shown in FIG. 2, comprises a light guide 22 having the general shape of a sheet bound in the direction of the thickness by two main guiding faces 32, 34 substantially parallel to one another over at least a part of the light guide 22. The sheet itself can have a non-planar shape as can be seen in FIG. 2. An exit face 36 is situated on at least one of the edge faces of the light guide 22.

In the example described, the light guide 22 is monolithic, in other words, formed from a single piece, for example by molding of a plastic material.

The lighting device 12 also comprises, in this example, three printed circuit boards 24, 26, 28, disposed parallel to the main guiding face 34 of the light guide 22. These printed circuit boards 24, 26, 28 are used to power, to control and to carry light sources 30.

Here, there are ten light sources, in the present case LEDs 30. It will be understood that this number is not limited to ten and notably depends on the dimensions of the light guide 22.

It will be noted that the axis of emission of light from each LED 30 is perpendicular to the sheet of the light guide 22. This advantageously allows a more compact device to be obtained in a dimension parallel to the sheet of the light guide 22. Furthermore, the LEDs 30 carried by the same printed circuit board 24, 26, 28 are in the same plane, one next to another along the edge strip of the light guide 22.

The light emitted by each LED 30 penetrates into the light guide 22 via an entry face 44 for the light parallel to the sheet of the light guide 22. The entry face 44 in this example is plane, but it could have a convex or concave shape.

The light guide 22 is also bound by the exit face 36 for the light, main reflection faces 38 for the light, a secondary reflection face 40 for the light and link faces 42 connecting the reflection faces 38, 40. The link faces 42, or at least one portion of these link faces 42, are preferably parallel to the optical axis 16.

The light guide 22 furthermore comprises couplers 46, 47. Each coupler 46, 47 generally comprises several reflection facets 48. The couplers 46, 47 are positioned on the main guiding face 32, opposite each entry face 44. It will therefore be understood that the couplers 46, 47 are associated with each entry face 44. Couplers 46, 47 of this type are for example described in the document FR 2 943 118.

Each entry face 44 is configured for transmitting the light emitted by the LED 30 on the reflection facets 48 of the coupler 46, 47 associated with it.

Figure 4:
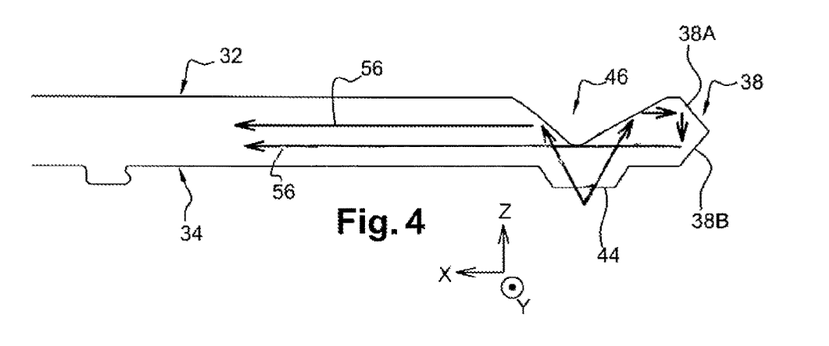
FIG. 4 is a cross-sectional view along the axis IV-IV showing the path of the light rays.

A part of the light transmitted by the entry face 44 to the coupler 46 is reflected by the latter and transmitted directly toward the exit face 36 of the light guide 22, as can be seen in FIG. 4.

Another part of the light transmitted by the entry face 44 to the coupler 46 is transmitted by the coupler 46 toward the main reflection face 38 associated with it.

Each main reflection face 38 has a parabolic longitudinal cross-section comprising two branches extending on either side of a plane of symmetry of the cross-section and having the same length.

As can be seen in FIG. 4, the axis of symmetry of the parabolic cross-section is parallel to the X axis and the main reflection face 38 is arranged to allow reflection of the light transmitted by the coupler 46, by a single or double reflection on the main reflection face 38, in the form of a beam of parallel rays 56.

The path of the light rays is shown in a general manner in FIGS. 3 to 7 by the reference 56.

In FIG. 4, it can be seen that the main reflection face 38 has a transverse cross-section with a V-shaped profile formed by two surfaces 38A and 38B forming, in the present case, an angle of 90° between them in the XZ plane and an angle of 45° with the X and Z axes in this same plane. A part of the rays transmitted by the coupler 46 toward the main reflection face 38 is reflected a first time on the surface 38A toward the surface 38B before being directed toward the exit face 36. Another part of the rays transmitted by the coupler 46 toward the main reflection face 38 is reflected and directed directly toward the exit face 36.

Figure 5:
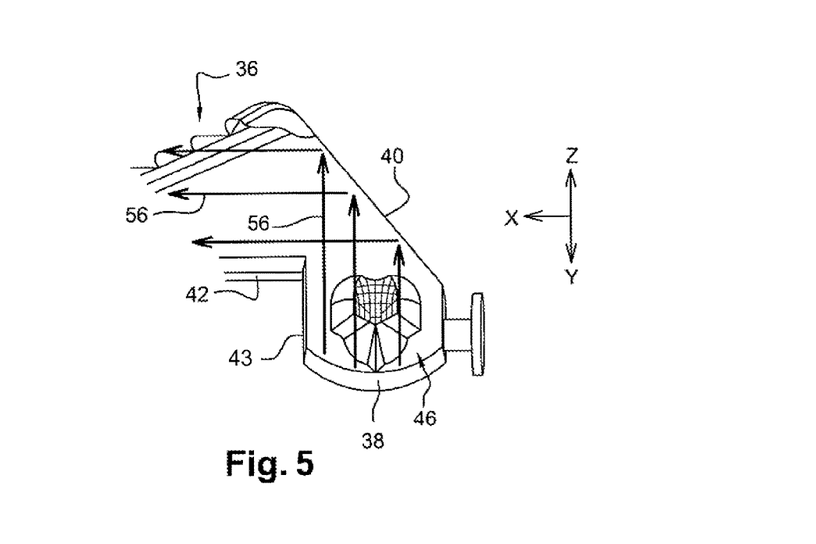
FIG. 5 is a larger-scale view of a detail of FIG. 3 showing the path of the light rays.

In FIG. 5, for one of the couplers, in the present case the coupler 46 situated at one end of the light guide 22, the axis of symmetry of the parabolic longitudinal cross-section of the main reflection face 38 is perpendicular to the X axis and the secondary reflection face 40 forms an angle of 45° with respect to the X axis in the plane of the sheet of the light guide 22. This arrangement of the coupler 46 and of the reflection faces 38, 40 allows the dimensions and hence the space occupied by the light guide 22 to be reduced rendering it more compact. It will be noted that in FIG. 5, the first link face 42 is parallel to the X axis and the second link face 42 is perpendicular to the X axis; the second link face 42 could however form, with the X axis, an angle different from 90°. The angle formed by this second link face 42 and the X axis depends notably on the relative orientation of the main reflection face 38 and secondary reflection face 40.

The reflection faces 38, 40 may furthermore comprise, at least over a portion of their length, an aluminized surface.

Figure 3:
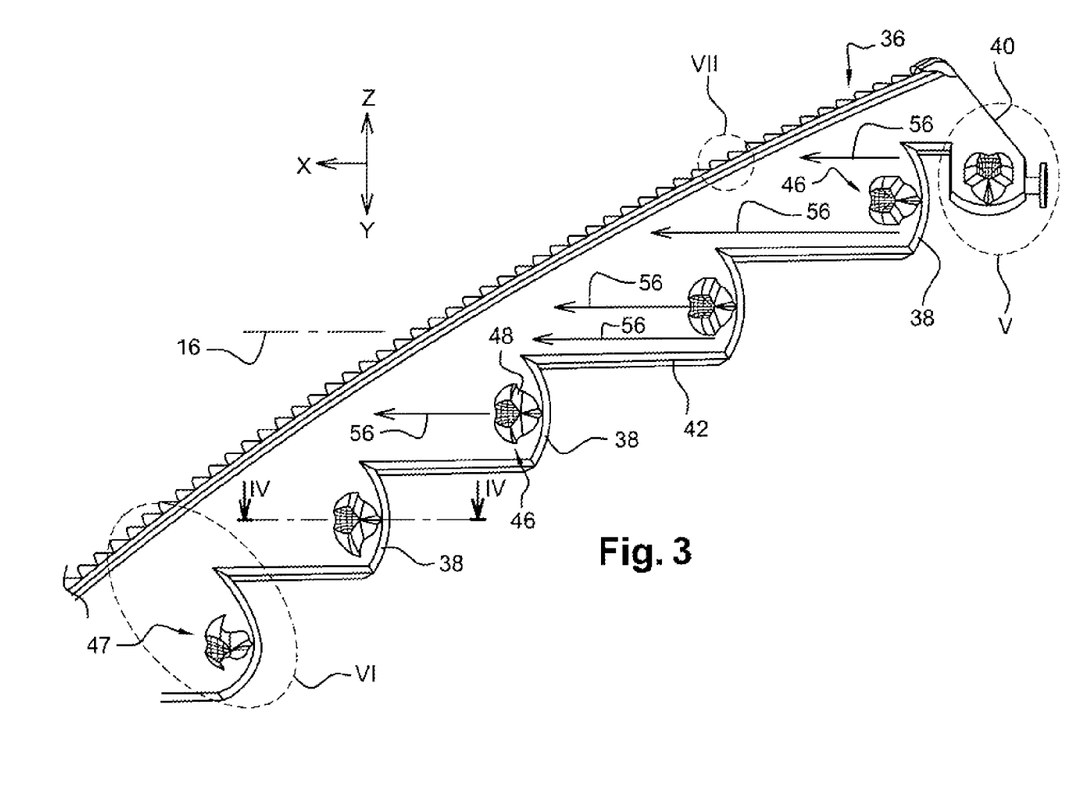
FIG. 3 is a partial view of the light guide in FIG. 2 in the direction of the arrow III showing the path of the light rays.

The exit face 36 illustrated in FIGS. 2 and 3 is curved in different directions, notably two mutually-perpendicular directions. Thus, in FIG. 2, the exit face 36 exhibits a relatively pronounced curved shape or curvature directly above the printed circuit board 26, whereas in FIG. 3, viewed in a plane perpendicular to that of FIG. 2, the exit face 36 exhibits a less pronounced curvature; the exit face 36 is overall neither parallel nor perpendicular to the optical axis 16.

Figure 6:
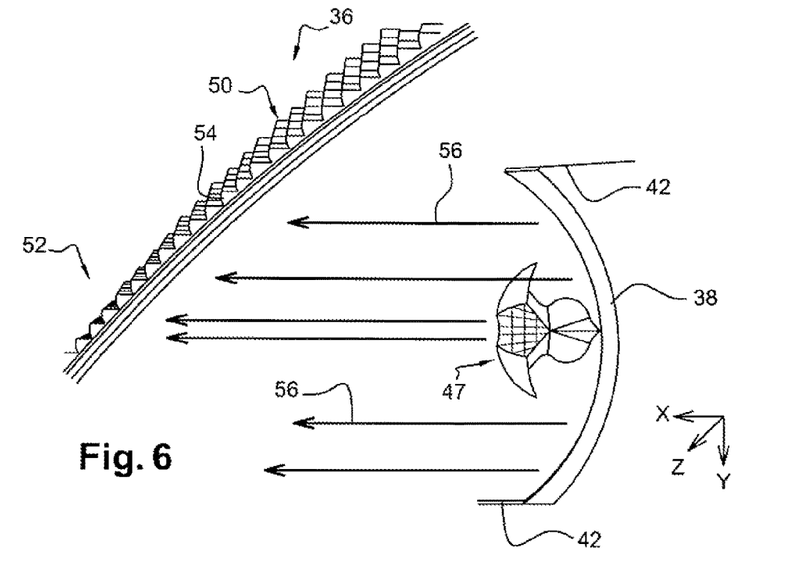
FIG. 6 is a larger-scale view of a detail, seen in perspective, of FIG. 3 showing the path of the light rays.

FIG. 6 shows the coupler 47 which is different from the other couplers 46. The shape and the arrangement of the reflection facets 48 have been modified in order to take into account the pronounced curvature of this part of the light guide 22. In the example shown, only the coupler 47 is different. It is possible, depending on the curved shape of the light guide 22, to have more than two different types of couplers 46, 47. Thus, it could be envisioned to form couplers 46, 47 that are all different from one another, according to the curvature of the light guide 22.

FIG. 6 also shows the exit face 36 in perspective. This exit face 36 takes the form of a staircase having plane steps 50 perpendicular to the Y axis and counter-steps 52 each comprising one or more exit facets 54 for the light. In this example, the exit facets 54 have a convex shape.

For example, the plane steps 50, in the direction of the optical axis 16, in other words the X axis, and the counter-steps 52, in a direction perpendicular to the X axis, can have a length of less than 5 mm, preferably less than 3 mm. In the example shown, the plane steps 50 and the counter-steps 52 have a length of 2 mm.

The path of the light within the light guide 22 will now be described.

The light emitted by each LED 30 is refracted by the entry face 44 in the light guide 22 and is transmitted to the couplers 46, 47 where it is reflected by the reflection facets 48 within the light guide 22. The couplers 46, 47 transmits a part of this light directly to the main reflection face 38 which directs it, in the form of a beam of parallel rays 56, directly toward the exit face 36 in a direction forming an angle of 5° at the most with respect to the optical axis 16 of the light guide 22.

By one of the couplers 46, 47, as is shown in FIG. 5, the beam of parallel rays 56 is reflected by the main reflection face 38 toward the secondary reflection face 40 which in turn reflects it toward the exit face 36 in a direction forming an angle of 5° at the most with respect to the optical axis 16 of the light guide 22. In this alternative, it will be understood that the beam of parallel rays 56 is directed indirectly from the main reflection face 38 toward the exit face 36.

Owing to the fact that the branches of the parabola forming the main reflection face 38 are of similar length, with a ratio of shorter length over longer length greater than 80%, or even identical, the light is received in a relatively uniform manner on the main reflection face 38 and the reflected beam of parallel rays 56 exhibit a more uniform intensity than in the case where the branches of the parabola have different lengths, with a ratio of short length over long length of less than 80%, as is the case in light guides of the prior art. Thus, the formation of an alternation of brighter and dimmer points in the beam emitted by the light guide 22 is reduced, or even very greatly reduced with respect to what can be observed in known guides.

Figure 7:
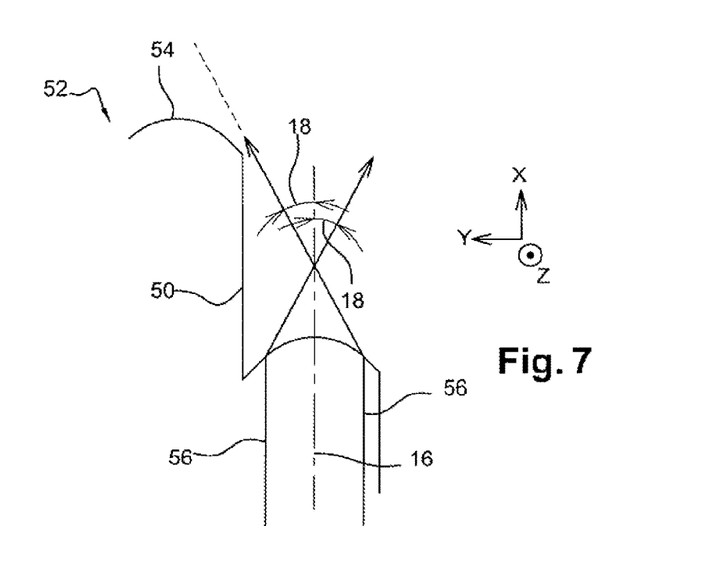
FIG. 7 is a larger-scale view of a detail of FIG. 3 showing the path of the light rays.

When the beam of parallel rays 56 reach the exit face 36, each exit facet 54 refracts the beam of parallel rays 56 as is shown in FIG. 7.

The light exiting from the light guide 22 is therefore emitted at an angle 18 with respect to the optical axis 16. This angle 18 is for example in the range between 0° and 30°, preferably between 0° and 25°.

By virtue of the convex shape of each exit facet 54, the beam of parallel rays 56 situated on the right hand side of the optical axis 16 are refracted toward the left and the beam of parallel rays 56 situated on the left hand side of the optical axis 16 are refracted toward the right. This results in the beam of parallel rays 56 refracted toward the left, in the example shown in FIG. 7, not being oriented toward the plane step 50 adjacent to the exit facet 54 from where the beam of parallel rays 56 are emitted. All the intensity of the beam of parallel rays 56 refracted by the diffraction exit facets 54 is thus conserved.

Figure 8:
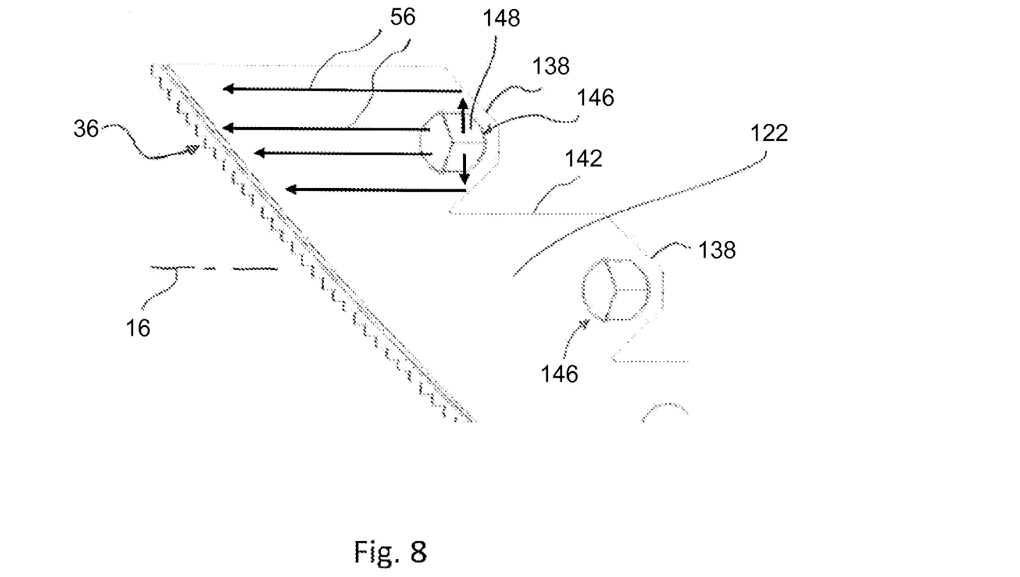
FIG. 8 is a partial view of another embodiment of the light guide in FIG. 2 in the direction of the arrow III showing the path of the light rays.

FIG. 8 illustrates a light guide 122 according to the invention, where the light guide 122 differs from that illustrated in FIG. 3 by the fact that it has main reflection faces 138 of different shape and different couplers 146.

The light guide 122 is also bounded by an exit face 36 for the light, which may be identical to that in FIG. 3, by the main reflection faces 138 for the light and by link faces 142 connecting the main reflection faces 138. The link faces 142 are preferably parallel to the optical axis 16.

Figure 9:
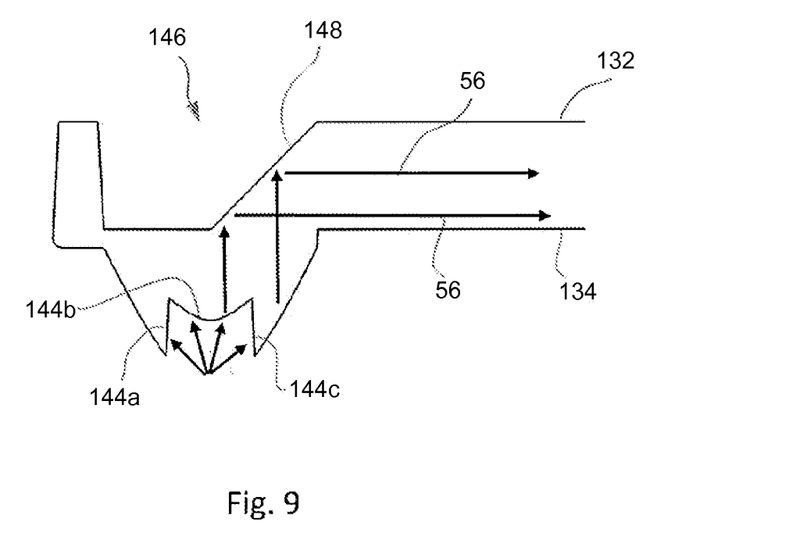
FIG. 9 is a section of a coupler used in the embodiment in FIG. 8 showing the path of the light rays.

The light guide 122 furthermore comprises couplers 146. Each coupler 146 generally comprises several reflection facets 148, three in this example. The couplers 146 are positioned on the main guiding face 132, in front of the entry faces of each coupler 146. It will therefore be understood that the coupler 146 is associated with each entry face. As illustrated in FIG. 9, this entry face has several entry facets 144a, 144b and 144c.

Each entry facet 144a, 144b and 144c is configured for transmitting the light emitted by the LED 30 onto the reflection facets 148 of the coupler 146 associated with it.

A part of the light transmitted by the entry face to the coupler 146 is reflected by the latter and transmitted directly toward the exit face 36 of the light guide 122, as can be seen in FIG. 9.

Another part of the light transmitted by the entry face to the coupler 146 is transmitted by the coupler 146 toward the main reflection face 138 associated with it.

Each main reflection face 138 has a longitudinal cross-section with sides inclined with respect to the optical axis 16 of the light guide 122, for example, as illustrated in FIG. 8, two sides inclined at 45° with respect to the optical axis 16 of the light guide 122. In this example, the two inclined sides form two branches, which can, as illustrated, extend on either side of a plane of symmetry of the cross-section and can have the same length.

As can be seen in FIG. 8, the main reflection face 138 and its sides are arranged in order to allow reflection of the light transmitted by the coupler 146, by a single or double reflection on the main reflection face 138, in the form of a beam of parallel rays 56.

For example, as illustrated, the reflection facets 148, which may be plane, return the beam of parallel rays 56 in directions approximately perpendicular to the optical axis 16. The sides of the main reflection face 138 are inclined at 45° with respect to the optical axis 16 of the light guide 122 and then reflect these rays in a direction approximately parallel to the optical axis 16 of the light guide 122.

In FIGS. 8 to 9, the path of the light rays is generally indicated by the reference 56.

It goes without saying that numerous modifications could be applied to the invention without straying from the scope of the latter.

For example, the couplers 46, 47 may be replaced by other elements allowing the light entering via the entry face 44 of the light guide 22 to be directed toward the exit face 36 and toward the main reflection face 38. It may also be envisioned to position several main reflection faces 38 such that the axis of the parabolic cross-section is not parallel to the X axis.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A light guide for a lighting and/or signaling device of an automobile vehicle, comprising:
    at least one entry face;
    at least one coupler;
    at least one main reflection face; and
    an exit face;
    said light guide being arranged in such a manner that, when a light source is disposed at a predetermined point with respect to said light guide, said at least one entry face transmits a light from said light source to said at least one coupler and said at least one coupler transmits a part of the light to said at least one main reflection face which directs the part of the light, in the form of a beam of parallel rays, directly or indirectly, toward said exit face in a direction forming an angle of 5° at most with respect to an optical axis of said light guide, wherein
    said light guide takes a form of a sheet, said exit face being on at least one of edge faces of said sheet, each of said at least one coupler being associated with said at least one main reflection face, said light guide comprises at least two couplers of said at least one coupler and two main reflection faces of said at least one main reflection face, said two main reflection faces are connected together by at least one link face with a rectilinear cross-section, parallel to said optical axis or forming an angle less than 5° with said optical axis, and
    a shape of said exit face is of a generally curved form, and an entire surface of said exit face includes steps.

2. The light guide, as claimed in claim 1, wherein said light guide is arranged in such a manner that said at least one main reflection face directs said beam of parallel rays directly toward said exit face.

3. The light guide as claimed in claim 2, wherein said at least one main reflection face has a cross-section comprising two branches.

4. The light guide as claimed in claim 2, wherein said steps of said exit face include steps parallel to a nearest 10° with respect to said optical axis and counter-steps each comprising at least one exit facet for the light such that the light exiting from each of said at least one exit facet is distributed within a cone whose axis is said optical axis.

5. The light guide as claimed in claim 1, further comprising a secondary reflection face designed to reflect, toward said exit face a beam coming from said at least one main reflection face.

6. The light guide as claimed in claim 5, wherein said steps of said exit face include steps parallel to the nearest 10° with respect to said optical axis and counter-steps each comprising at least one exit facet for the light such that the light exiting from each of said at least one exit facet is distributed within a cone whose axis is said optical axis.

7. The light guide as claimed in claim 1, wherein said at least one main reflection face has a cross-section comprising two branches.

8. The light guide as claimed in claim 7, wherein a ratio of length between a smaller branch and a larger branch is greater than 0.8.

9. The light guide as claimed in claim 8, wherein said two branches extend on either side of a plane of symmetry of said cross-section.

10. The light guide as claimed in claim 7, wherein said two branches of said cross-section of said at least one main reflection face have a same length.

11. The light guide as claimed in claim 8, wherein said cross-section is a parabolic cross-section.

12. The light guide as claimed in claim 10, wherein said two branches extend on either side of a plane of symmetry of said cross-section.

13. The light guide as claimed in claim 7, wherein said two branches extend on either side of a plane of symmetry of said cross-section.

14. The light guide as claimed in claim 7, wherein cross-section is a parabolic cross-section.

15. The light guide as claimed in claim 1, wherein said steps of said exit face include steps parallel to a nearest 10° with respect to said optical axis and counter-steps each comprising at least one exit facet for the light such that the light exiting from each of said at least one exit facet is distributed within a cone whose axis is said optical axis.

16. The light guide as claimed in claim 15, wherein said at least one exit facet has a convex shape.

17. A light guide assembly comprising:
the light guide as claimed in claim 1; and
at least one LED.

18. A lighting and/or of signaling device for an automobile vehicle comprising:
a light guide, said light guide including
at least one entry face,
at least one coupler,
at least one main reflection face, and
an exit face,
said light guide being arranged in such a manner that, when a light source is disposed at a predetermined point with respect to said light guide, said at least one entry face transmits a light from said light source to said at least one coupler and said at least one coupler transmits a part of the light to said at least one main reflection face which directs the part of the light, in the form of a beam of parallel rays, directly or indirectly, toward said exit face in a direction forming an angle of 5° at most with respect to an optical axis of said light guide, wherein
said light guide takes a form of a sheet, said exit face being on at least one of edge faces of said sheet, each of said at least one coupler being associated with said at least one main reflection face, said light guide comprises at least two couplers of said at least one coupler and two main reflection faces of said at least one main reflection face, said two main reflection faces are connected together by at least one link face with a rectilinear cross-section, parallel to said optical axis or forming an angle less than 5° with said optical axis, and
a shape of said exit face is of a generally curved form, and an entire surface of said exit face includes steps.

* * * * *